United States Patent

Dinur

[11] Patent Number: 5,316,220
[45] Date of Patent: May 31, 1994

[54] IRRIGATOR WITH MUTUALLY PERPENDICULAR WATER PATH COMPONENTS

[75] Inventor: Eldad Dinur, Kibbutz Naan, Israel

[73] Assignee: Naan Irrigation Systems, Israel

[21] Appl. No.: 931,917

[22] Filed: Aug. 18, 1992

[30] Foreign Application Priority Data

Aug. 22, 1991 [IL] Israel .......... 99281

[51] Int. Cl.⁵ .......... B05B 1/02; B05B 15/00
[52] U.S. Cl. .......... 239/542; 239/547; 239/550; 239/566
[58] Field of Search .......... 239/542, 547, 550, 566, 239/553, 553.3, 553.5

[56] References Cited

U.S. PATENT DOCUMENTS

| | | |
|---|---|---|
| 3,791,587 | 2/1974 | Drori .......... 239/542 X |
| 4,022,384 | 5/1977 | Hoyle et al. .......... 239/542 |
| 4,166,576 | 4/1979 | Harrison . | 
| 4,281,798 | 8/1981 | Lemelstrich .......... 239/542 |
| 4,466,462 | 8/1984 | Morris . |
| 4,850,531 | 7/1989 | Littleton .......... 239/547 X |
| 5,031,837 | 7/1991 | Hanish .......... 239/542 X |

FOREIGN PATENT DOCUMENTS 0237232 8/1989 European Pat. Off. .
2387690 12/1978 France .

Primary Examiner—Andres Kashnikow
Assistant Examiner—William Grant
Attorney, Agent, or Firm—Darby & Darby

[57] ABSTRACT

An irrigation device including a first interior water path defining member and a second exterior water path defining member, cooperating with the first water path defining member to define a circuitous water path including sequential water path components extending generally in three mutually perpendicular directions.

17 Claims, 7 Drawing Sheets

1

IRRIGATOR WITH MUTUALLY PERPENDICULAR WATER PATH COMPONENTS

FIELD OF THE INVENTION

The present invention relates to agricultural irrigation devices generally and more specifically to relatively low volume water sprayers and drip irrigators.

BACKGROUND OF THE INVENTION

Various types of low volume water sprayers and drip irrigators are known for agricultural applications. Generally speaking, they all share certain common goals, provision of a generally low volume, low pressure output water flow at a generally uniform flow rate, notwithstanding variations in the input pressure, and resistance to clogging by impurities in the water.

It is well known that the use of a narrow passageway provides efficient pressure and flow rate reduction but involves the risk of clogging by particulate matter in the water. In this and other contexts a serpentine passageway has been found to provide enhanced pressure and flow rate reduction with a relatively wide passageway.

U.S. Pat. No. 4,466,462 describes a circuitous path flow restrictor including a fluid director member having a core and a plurality of fins extending from the core and defining alternately axially offset notches. The fluid director member is encircled by a containment member such that a serpentine fluid flow path is defined therebetween to provide a fluid flow resistance level equivalent to a simple orifice of much smaller diameter. The fluid director member can be made by a precision casting process for economy of manufacture.

SUMMARY OF THE INVENTION

The present invention seeks to provide an improved, compact irrigation device which is injection moldable from a small number of parts and which is relatively resistant to clogging due to particulate matter in the water.

There is thus provided in accordance with a preferred embodiment of the present invention an irrigation device including a first interior water path defining member and a second exterior water path defining member, cooperating with the first water path defining member to define a circuitous water path including sequential water path components extending generally in three mutually perpendicular directions.

There is also provided in accordance with another preferred embodiment of the present invention an irrigation device including a first interior water path defining member and a second exterior water path defining member, cooperating with the first water path defining member to define a circuitous water path, the irrigation device including a water inlet and a water outlet arranged about an axis and the circuitous water path including a plurality of different circumferential path portions arranged at a plurality of different radii with respect to the axis.

In accordance with a preferred embodiment of the present invention, the water path also includes a plurality of radially extending path portions and a plurality of axially extending path portions.

Preferably the water path is defined such that each circumferential path portion is separated from a succeeding circumferential path portion by at least one radially extending path portion and at least one axially extending path portion.

In accordance with a preferred embodiment of the present invention, the irrigation device comprises only two pieces, which are readily injection molded of plastic and press-fit together.

The irrigation device may be a sprinkler or alternatively a dripper.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
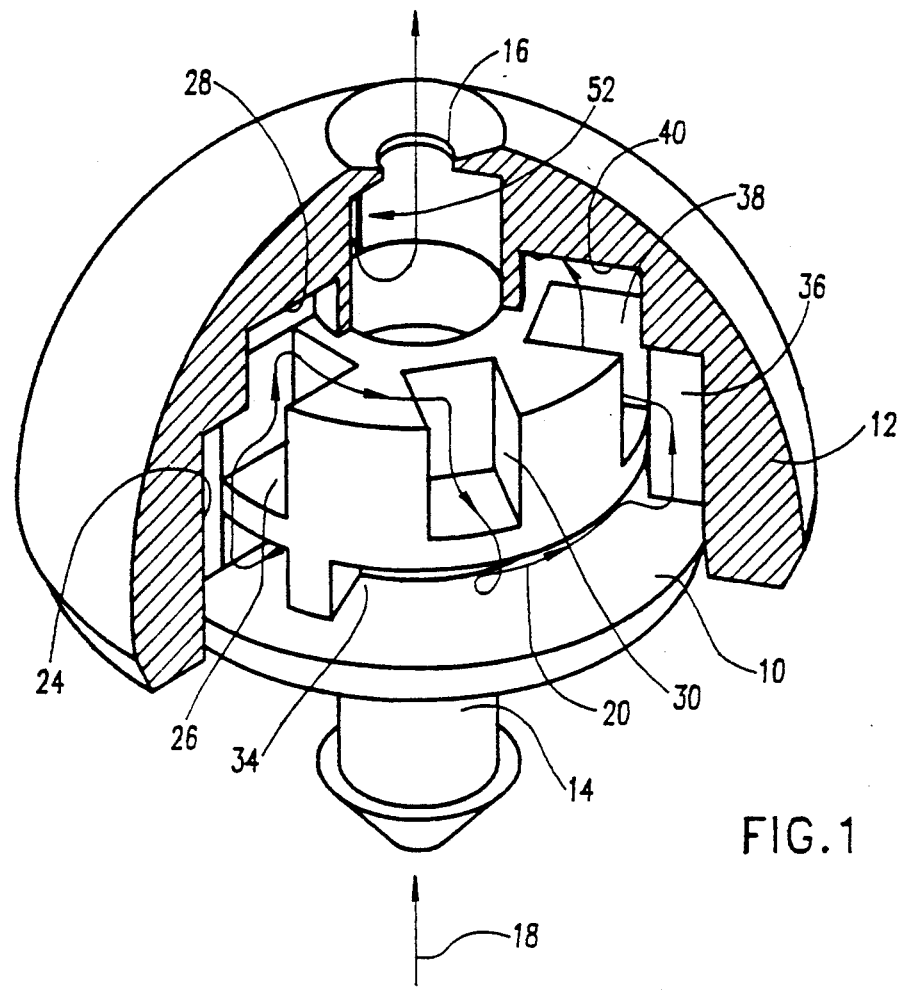
FIG. 1 is a partially cut away pictorial illustration of an irrigation device constructed and operative in accordance with a preferred embodiment of the present invention.

Reference is now made to FIGS. 1–4 and 6A–6D, which illustrate a sprinkler constructed and operative in accordance with a preferred embodiment of the present invention and comprising an interior flow path defining element 10 and an exterior flow path defining element 12, cooperating therewith.

Element 10 defines a water inlet 14, typically of the piercing type, which can be simply inserted in an appropriately sized hole in a water conduit, such as a plastic water pipe. Element 12 defines a water outlet aperture 16, which, in the illustrated, preferred embodiment of the invention is axially aligned with inlet 14, along an axis 18 defined by arrow labeled 18, which also defines the water inlet direction.

As can be seen from the drawings, press fit engagement between the interior element 10 and the exterior element 12 defines a multi-level, multi-directional, multi-radius tortuous flow reducing pathway, which is illustrated generally by arrowed line 20.

Figure 6A:
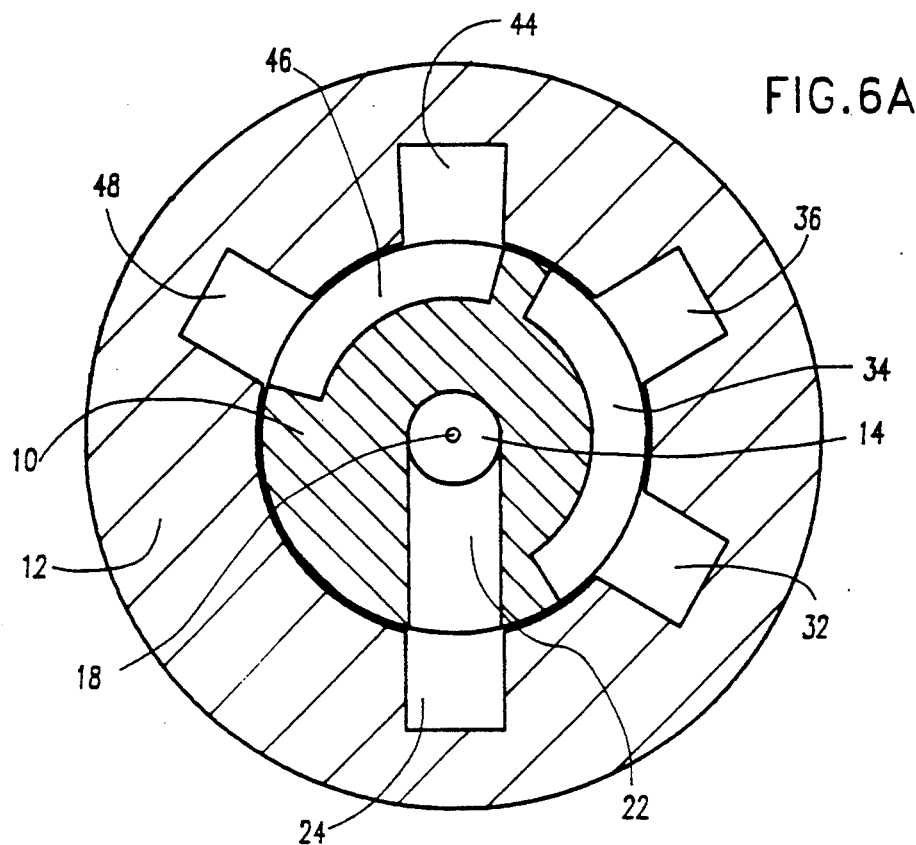
FIGS. 6A, 6B and 6C are sectional illustrations of the sprinkler of FIG. 4, taken along lines A—A, B—B and C—C of FIG. 4.

Specifically, and as seen with particularity in FIG. 6A, water from inlet 14 passes along a passageway 22 in interior element 10 and communicates with a recess 24 in exterior element 12. Recess 24 defines an axial flow path portion which extends parallel to axis 18, and which communicates with a recess 26 formed in interior element 10 (FIG. 6B), thus defining a radially extending flow path portion which extends radially inward with respect to axis 18.

Recess 26 communicates with a circumferentially extending recess 28 formed in element 12 (FIG. 6C), which defines a circumferentially extending flow path portion extending at a first radius about axis 18 and communicating with a corresponding recess 30, azimuthally separated from recess 26 and also formed in element 10.

Figure 6B:
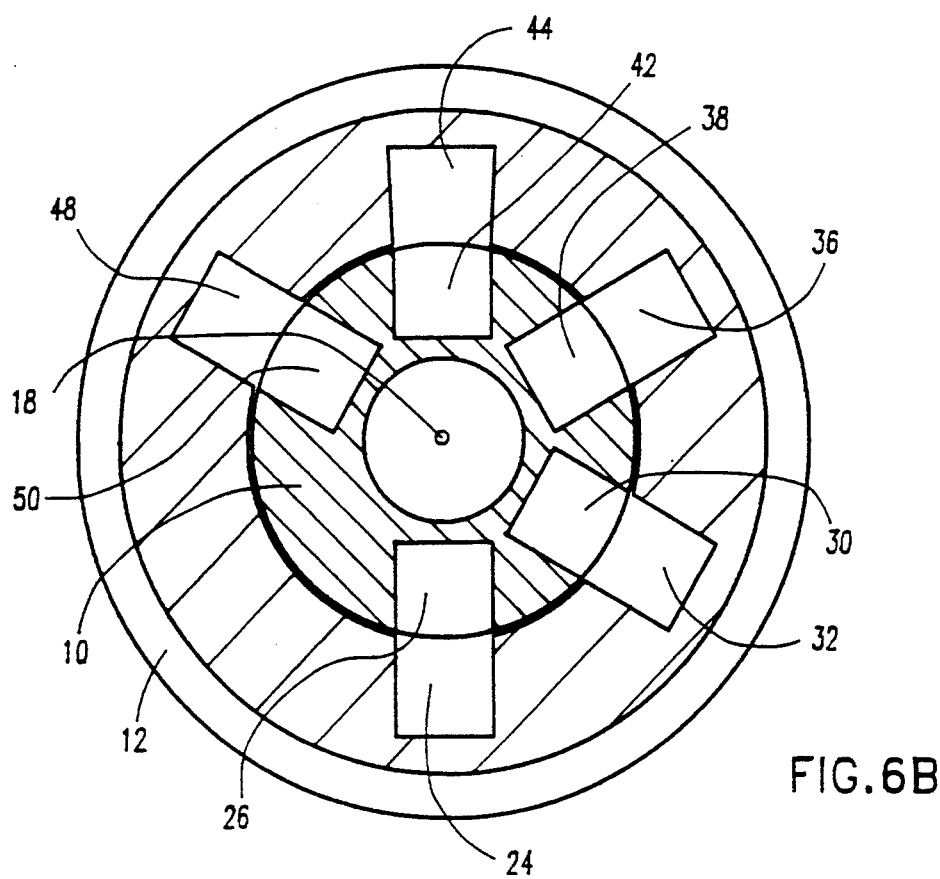
Figure 6C:
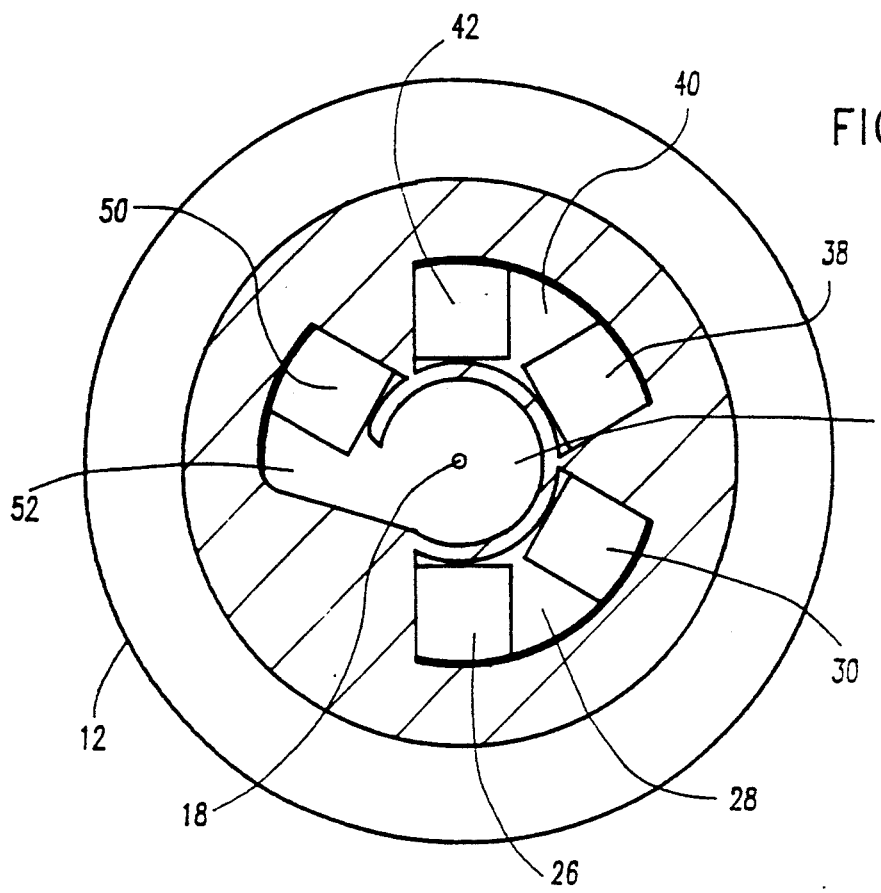
Figure 6D:
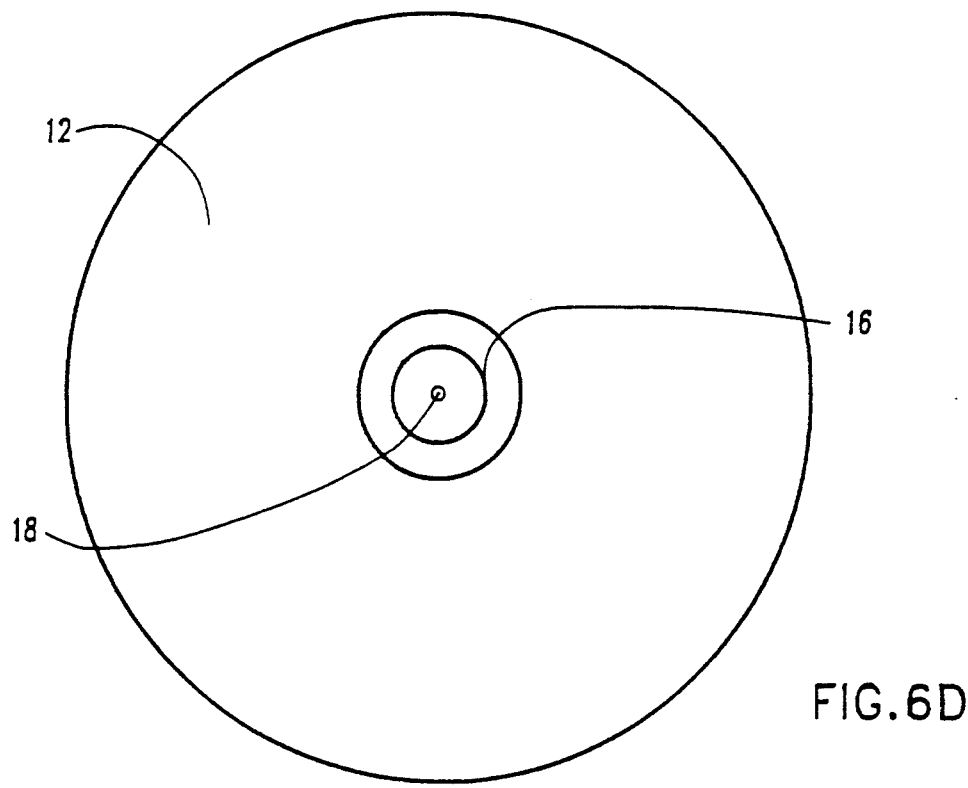
FIG. 6D is a plan view illustration of the sprinkler of FIG. 4, taken along the direction indicated by arrow D in FIG. 4.

The water path from recess 28 to recess 30 thus defines an axial flow path portion, as seen clearly in FIG. 1, wherein the water moves in a direction opposite that indicated by arrow 18. From recess 30, the water moves along a radially outwardly extending flow path portion into a recess 32 formed in element 12 (FIG. 6B).

Recess 32 defines an axially extending flow path portion which extends parallel to axis 18 but in a direction opposite to that of arrow 18. Recess 32 communicates with a circumferentially extending recess 34 formed in element 10 (FIG. 6A), which defines a circumferentially extending flow path portion extending at a second radius, smaller than the first radius, about axis 18 and communicating with a corresponding recess 36, azimuthally separated from recess 34 and also formed in element 12.

Recess 36 defines an axial flow path portion which extends parallel to axis 18, and which communicates with a recess 38 formed in interior element 10 (FIG. 6B), thus defining a radially extending flow path portion which extends radially inward with respect to axis 18.

Recess 38 communicates with a circumferentially extending recess 40 formed in element 10 (FIG. 6C), which defines a circumferentially extending flow path portion extending at the first radius about axis 18 and communicating with a corresponding recess 42, azimuthally separated from recess 38 and also formed in element 10.

The water path from recess 40 to recess 42 thus defines an axial flow path portion, as seen clearly in FIG. 1, wherein the water moves in a direction opposite that indicated by arrow 18. From recess 42, the water moves along a radially outwardly extending flow path portion into a recess 44 formed in element 12.

Recess 44 defines an axially extending flow path portion which extends parallel to axis 18 but in a direction opposite to that of arrow 18. Recess 44 communicates with a circumferentially extending recess 46 formed in element 10 (FIG. 6A), which defines a circumferentially extending flow path portion extending at the second radius, about axis 18 and communicating with a corresponding recess 48, azimuthally separated from recess 44 and also formed in element 12.

Recess 48 defines an axial flow path portion which extends parallel to axis 18, and which communicates with a recess 50 formed in interior element 10 (FIG. 6B), thus defining a radially extending flow path portion which extends radially inward with respect to axis 18.

Recess 50 communicates via a passageway 52 (FIG. 6C) with the outlet 16.

Reference is now made to FIGS. 5 and 7A-7D, which illustrate a dripper constructed and operative in accordance with a preferred embodiment of the present invention and comprising an interior flow path defining element 110 and an exterior flow path defining element 112, cooperating therewith.

Element 110 defines a water inlet 114, typically of the piercing type, which can be simply inserted in an appropriately sized hole in a water conduit, such as a plastic water pipe. Element 112 defines a water outlet aperture 116, which, in the illustrated, preferred embodiment of the invention is axially aligned with inlet 114, along an axis 118 defined by arrow labeled 118, which also defines the water inlet direction.

Figure 2:
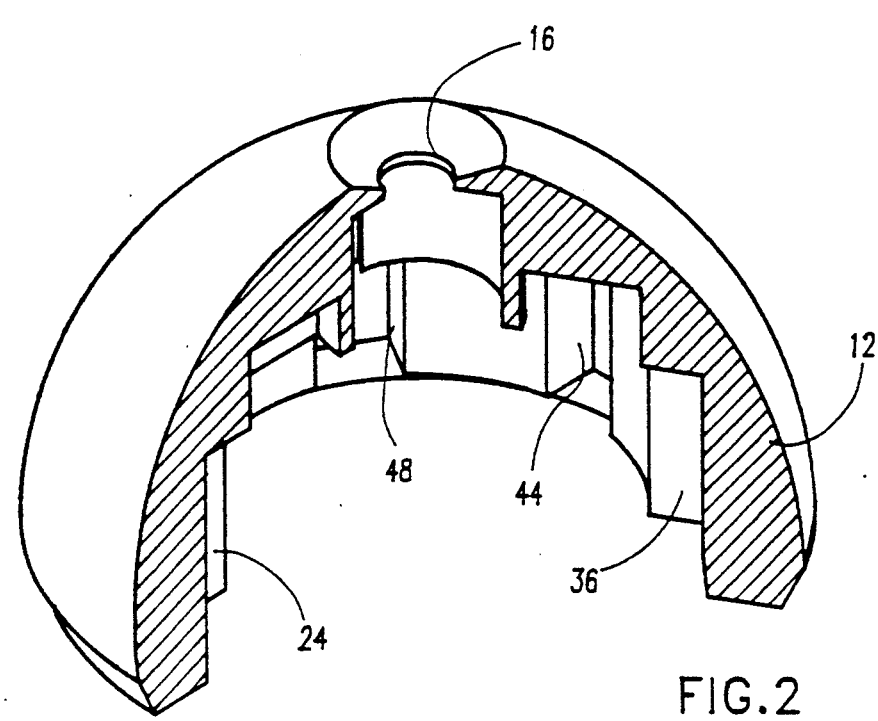
FIG. 2 is a partially cut away pictorial illustration of an exterior portion of the device of FIG. 1.
Figure 3A:
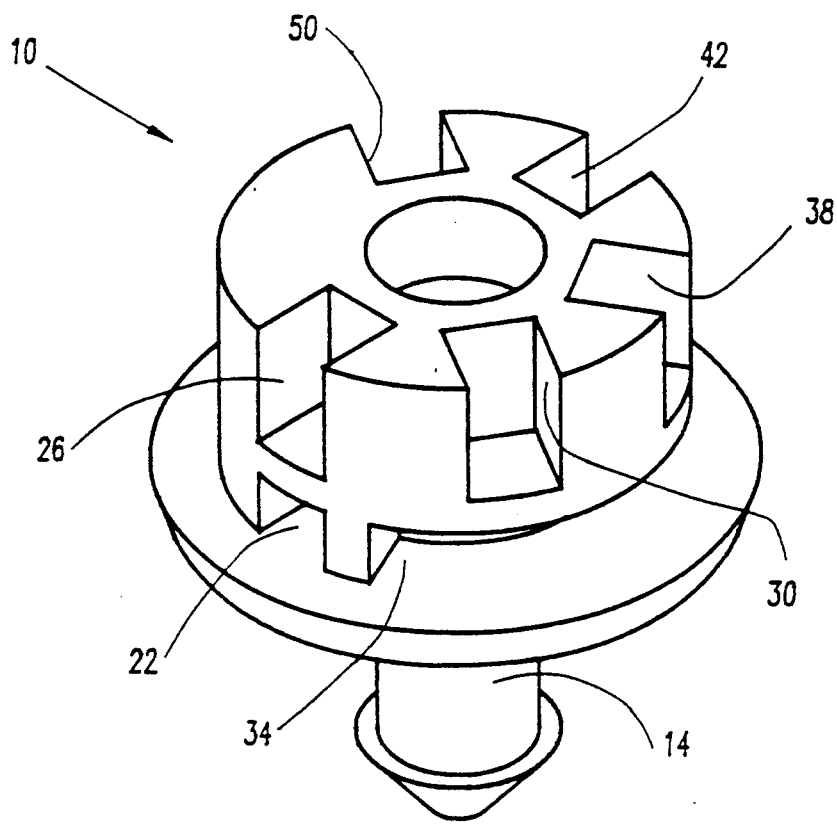
FIGS. 3A and 3B are two pictorial illustrations of an interior portion of the device of FIG. 1, the interior portion in the FIG. 3B being rotated by 180 degrees with respect to its orientation in FIGS. 1 and 3A.
Figure 3B:
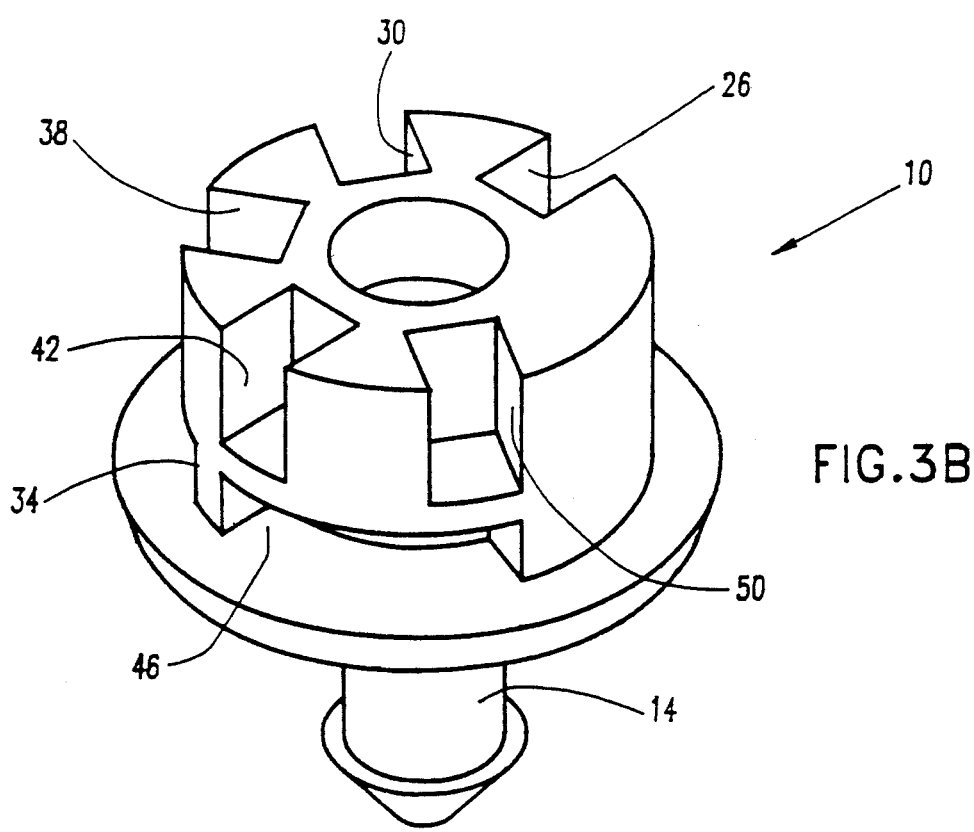
Figure 4:
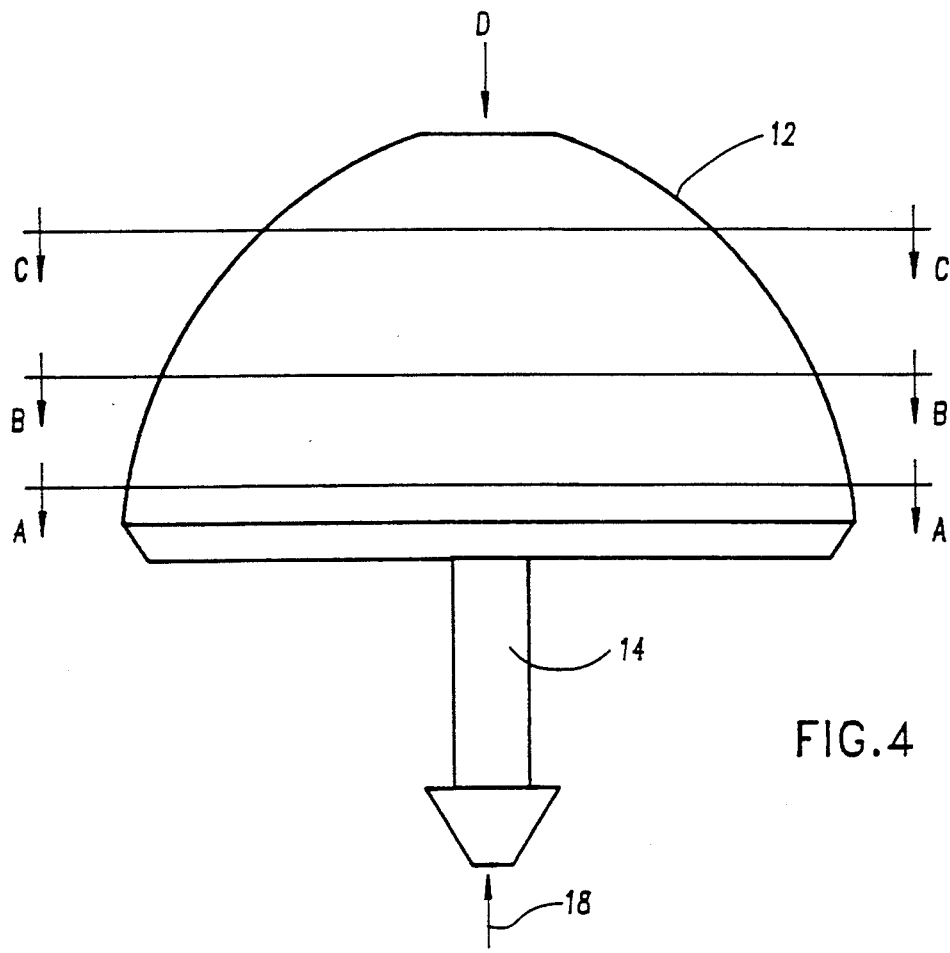
FIG. 4 is a plan view illustration of a sprinkler constructed and operative in accordance with a preferred embodiment of the present invention.
Figure 5:
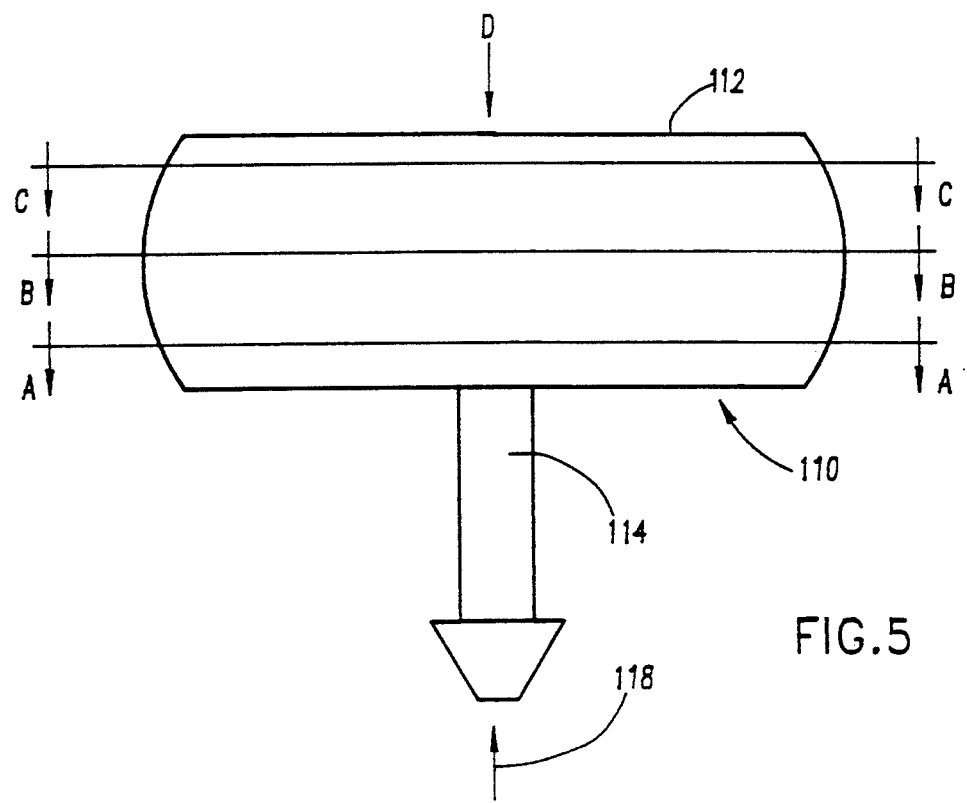
FIG. 5 is a plan view illustration of a dripper constructed and operative in accordance with a preferred embodiment of the present invention.

As can be seen from the drawings, press fit engagement between the interior element 110 and the exterior element 112 defines a multi-level, multi-directional, multi-radius tortuous flow reducing pathway, which is similar to that illustrated in FIGS. 1 and 2 but employs a greater number of direction changes and thus a longer flow path, thereby to provide greater flow rate reduction than the embodiment of FIGS. 1 and 2.

Figure 7A:
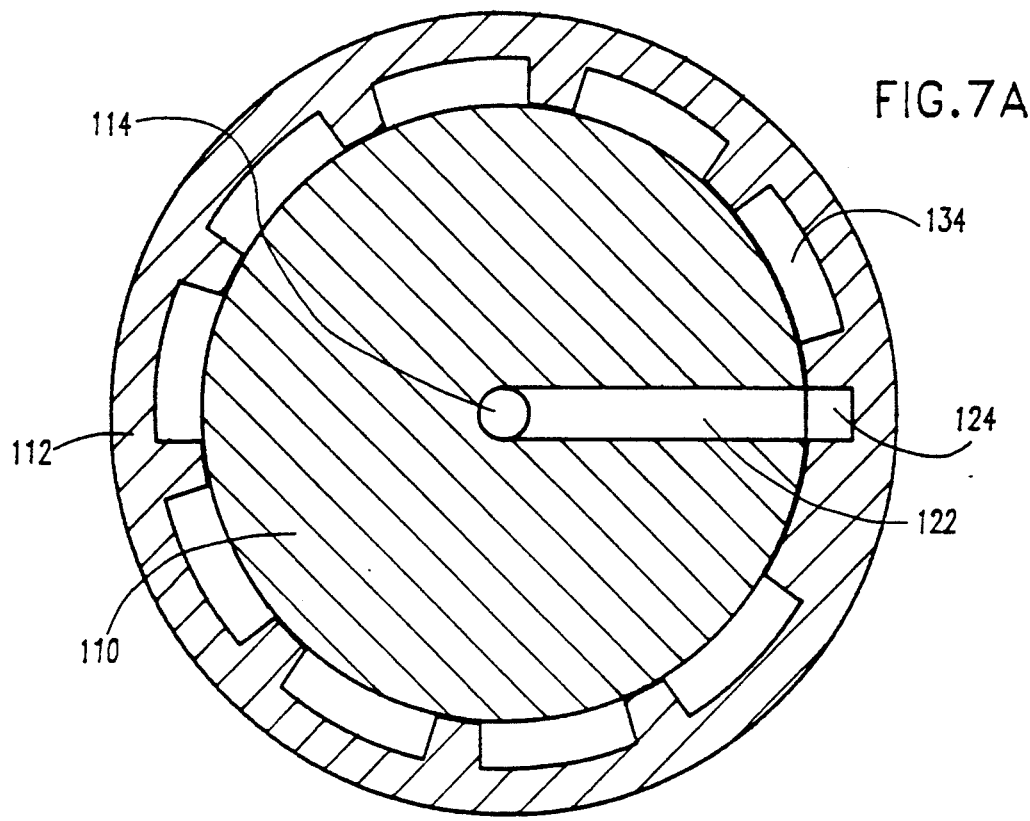
FIGS. 7A, 7B and 7C are sectional illustrations of the dripper of FIG. 5, taken along lines A—A, B—B and C—C of FIG. 5.
Figure 7B:
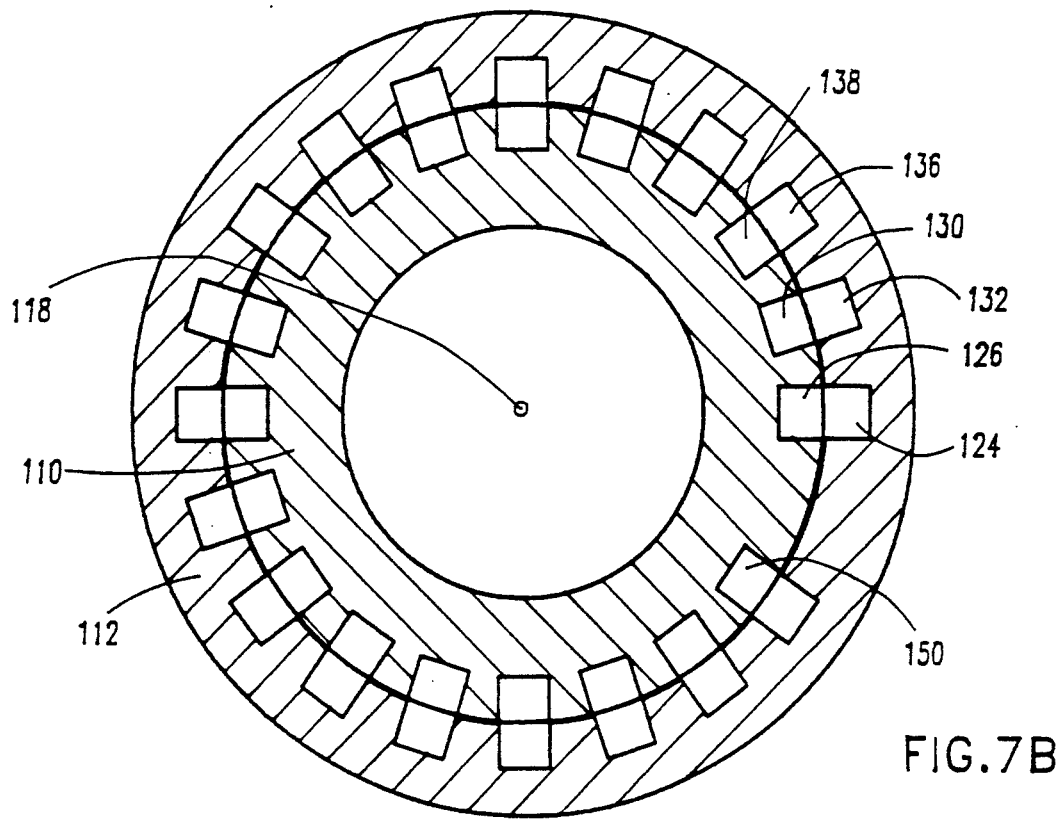
Figure 7C:
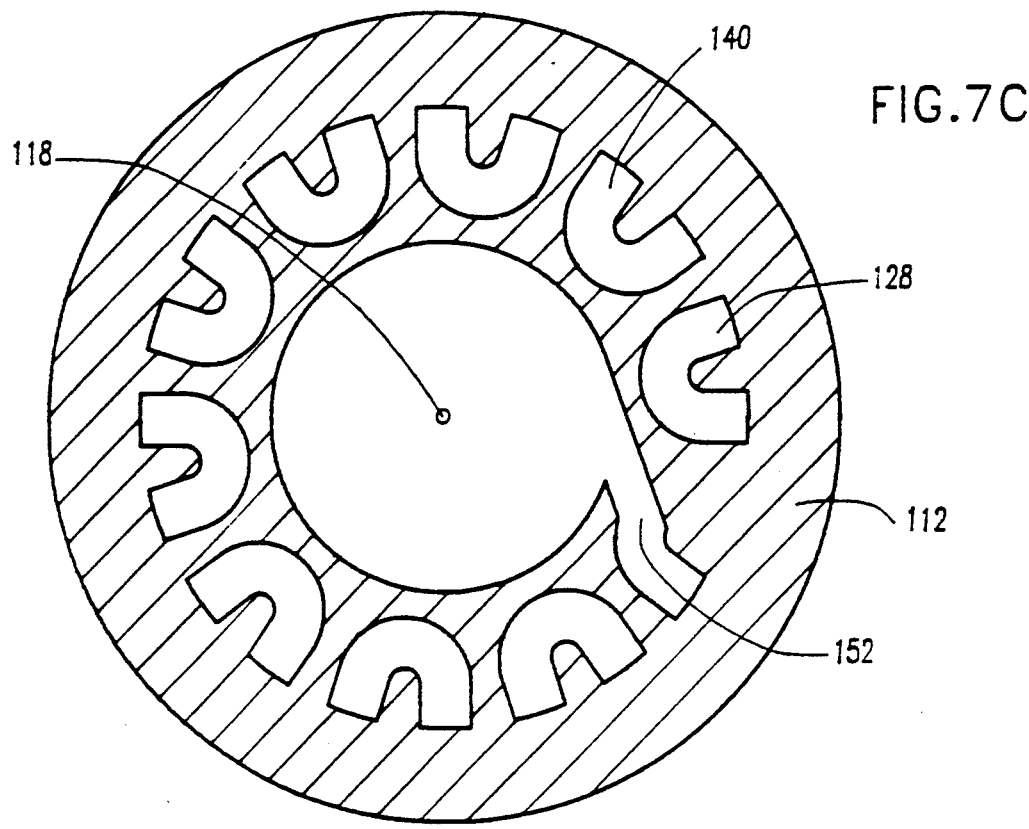
Figure 7D:
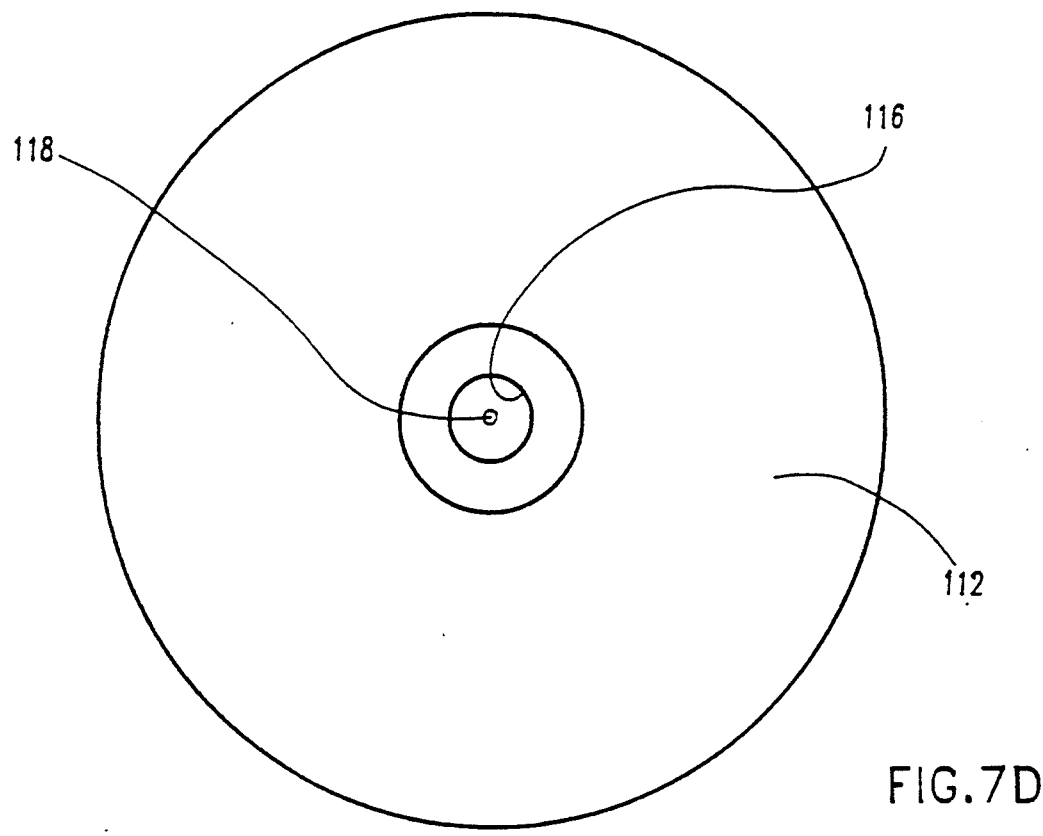
FIG. 7D is a plan view illustration of the dripper of FIG. 5, taken along the direction indicated by arrow D in FIG. 5.

Specifically, and as seen with particularity in FIG. 7A, water from inlet 114 passes along a passageway 122 in interior element 110 and communications with a recess 124 in exterior element 112. Recess 124 defines an axial flow path portion which extends parallel to axis 118, and which communicates with a recess 126 formed in interior element 110 (FIG. 7B), thus defining a radially extending flow path portion which extends radially inward with respect to axis 118.

Recess 126 communicates with a circumferentially and radially extending curved recess 128 formed in element 112 (FIG. 7C), which defines a corresponding flow path portion communicating with a corresponding recess 130, azimuthally separated from recess 126 and also formed in element 110.

The water path from recess 128 to recess 130 thus defines an axial flow path portion wherein the water moves in a direction opposite that indicated by arrow 118. From recess 130, the water moves along a radially outwardly extending flow path portion into a recess 132 formed in element 112.

Recess 132 defines an axially extending flow path portion which extends parallel to axis 118 but in a direction opposite to that of arrow 118. Recess 132 communicates with a circumferentially extending recess 134 formed in element 112 (FIG. 7A), which defines a circumferentially extending flow path portion extending at a second radius, larger than the radius at which recess 128 is located.

Recess 134 communicates with a recess 136, azimuthally separated from recess 130 and also formed in element 112.

Recess 136 defines an axial flow path portion which extends parallel to axis 118, and which communicates with a recess 138 formed in interior element 110 (FIG. 7B), thus defining a radially extending flow path portion which extends radially inward with respect to axis 118.

Recess 138 communicates with a circumferentially and radially extending curved recess 140 formed in element 112 (FIG. 7C), which may be identical to recess 128 in structure and function. Additional recesses identical to recesses 128 and 140 as well as recesses 130, 132, 134, 136 and 138 may be provided and interconnected in the same or similar manner as described hereinabove to define a flow and pressure reducing pathway of suitable flow and pressure reduction characteristics that terminates at a recess 150 which communicates with a passageway 152, which in turn leads to liquid outlet 116.

It will be apparent to persons skilled in the art that the present invention is not limited by what has been particularly shown and described hereinabove. Rather the scope of the present invention is defined only by the claims which follow:

I claim:

1. An irrigation device comprising:
   a first interior water path defining member; and
   a second exterior water path defining member, cooperating with the first water path defining member to define a circuitous water path including multiple sequential repeated groups of sequential water path components, said sequential water path components extending generally in three mutually perpendicular directions within each of said groups, said multiple sequential repeated groups following one another without interruption.

2. An irrigation device according to claim 1 and wherein:
   the irrigation device includes a water inlet and a water outlet arranged about an axis and the circuitous water path including a plurality of different circumferential path portions arranged at a plurality of different radii with respect to the axis.

3. Apparatus according to claim 2 and wherein said water path also includes a plurality of radially extending path portions and a plurality of axially extending path portions.

4. Apparatus according to claim 1 and wherein said irrigation device consists of only two pieces, which are readily injection molded of plastic and press-fit together.

5. An irrigation device comprising:
   a first interior water path defining member; and
   a second exterior water path defining member, cooperating with the first water path defining member to define a circuitous water path,
   the irrigation device including a water inlet and a water outlet arranged about an axis and the circuitous water path including a plurality of different circumferential path portions arranged at a plurality of different radii with respect to the axis,
   wherein said water path also includes a plurality of radially extending path portions and a plurality of axially extending path portions;
   and wherein said water path is defined such that each circumferential path portion is separated from a succeeding circumferential path portion by at least one radially extending path portion and at least one axially extending path portion.

6. A sprinkler comprising:
   a first interior water path defining member; and
   a second exterior water path defining member, cooperating with the first water path defining member to define a circuitous water path including multiple sequential repeated groups of sequential water path components, said sequential water path components extending generally in three mutually perpendicular directions within each of said groups, said multiple sequential repeated groups following one another without interruption.

7. A sprinkler according to claim 6 and wherein
   the sprinkler includes a water inlet and a water outlet arranged about an axis and the circuitous water path including a plurality of different circumferential path portions arranged at a plurality of different radii with respect to the axis.

8. Apparatus according to claim 7 and wherein said water path also includes a plurality of radially extending path portions and a plurality of axially extending path portions.

9. Apparatus according to claim 6 and wherein said irrigation device consists of only two pieces, which are readily injection molded of plastic and press-fit together.

10. Apparatus according to claim 7 and wherein said irrigation device consists of only two pieces, which are readily injection molded of plastic and press-fit together.

11. A sprinkler comprising:
    a first interior water path defining member; and
    a second exterior water path defining member, cooperating with the first water path defining member to define a circuitous water path,
    the sprinkler including a water inlet and a water outlet arranged about an axis and the circuitous water path including a plurality of different circumferential path portions arranged at a plurality of different radii with respect to the axis,
    wherein said water path also includes a plurality of radially extending path portions and a plurality of axially extending path portions;
    and wherein said water path is defined such that each circumferential path portion is separated from a succeeding circumferential path portion by at least one radially extending path portion and at least one axially extending path portion.

12. A drip irrigation device comprising:
    a first interior water path defining member; and
    a second exterior water path defining member, cooperating with the first water path defining member to define a circuitous water path including multiple sequential repeated groups of sequential water path components, said sequential water path components extending generally in three mutually perpendicular directions within each of said groups, said multiple sequential repeated groups following one another without interruption.

13. A drip irrigation device according to claim 12 and wherein:
    the drip irrigation device includes a water inlet and a water outlet arranged about an axis and the circuitous water path including a plurality of different circumferential path portions arranged at a plurality of different radii with respect to the axis.

14. Apparatus according to claim 13 and wherein said water path also includes a plurality of radially extending path portions and a plurality of axially extending path portions.

15. Apparatus according to claim 12 and wherein said irrigation device consists of only two pieces, which are readily injection molded of plastic and press-fit together.

16. Apparatus according to claim 13 and wherein said irrigation device consists of only two pieces, which are readily injection molded of plastic and press-fit together.

17. A drip irrigation device comprising:
    a first interior water path defining member; and
    a second exterior water path defining member, cooperating with the first water path defining member to define a circuitous water path,
    the drip irrigation device including a water inlet and a water outlet arranged about an axis and the circuitous water path including a plurality of different circumferential path portions arranged at a plurality of different radii with respect to the axis,
    wherein said water path also includes a plurality of radially extending path portions and a plurality of axially extending path portions;
    and wherein said water path is defined such that each circumferential path portion is separated from a succeeding circumferential path portion by at least one radially extending path portion and at least one axially extending path portion.

* * * * *